(12) United States Patent
Ueshima et al.

(10) Patent No.: US 6,929,543 B1
(45) Date of Patent: Aug. 16, 2005

(54) FISHING GAME DEVICE

(75) Inventors: Hiromu Ueshima, Kusatsu (JP); Katsuya Nakagawa, Kusatsu (JP)

(73) Assignee: SSD Company Limited, Shiga (JP)

( * ) Notice: Subject to any disclaimer, the term of this patent is extended or adjusted under 35 U.S.C. 154(b) by 318 days.

(21) Appl. No.: 09/856,178

(22) PCT Filed: Oct. 2, 2000

(86) PCT No.: PCT/JP00/06872

§ 371 (c)(1),
(2), (4) Date: Jun. 4, 2001

(87) PCT Pub. No.: WO01/24898

PCT Pub. Date: Apr. 12, 2001

(30) Foreign Application Priority Data

Oct. 4, 1999 (JP) .................................. 11-283235

(51) Int. Cl.[7] .................................................. A63F 9/24
(52) U.S. Cl. ................... 463/7; 463/1; 463/37; 463/38; 463/46; 463/47; 273/148 B
(58) Field of Search ................................ 463/1–5, 7, 8, 463/36, 37, 39, 46; 273/148 B, 317.1–317.6; 473/219–222; 73/514.34; D21/324, 325, 328, 329, 331

(56) References Cited

U.S. PATENT DOCUMENTS

| 4,521,020 | A | * | 6/1985 | Uemura et al. ................ 463/3 |
| 4,844,475 | A |   | 7/1989 | Saffer et al. |
| 4,924,131 | A | * | 5/1990 | Nakayama et al. ......... 310/329 |
| 5,232,223 | A |   | 8/1993 | Dornbusch |
| 5,481,915 | A | * | 1/1996 | Tabota et al. ............. 73/514.34 |
| 5,542,672 | A |   | 8/1996 | Meredith |
| 5,835,077 | A | * | 11/1998 | Dao et al. .................... 345/157 |
| D423,600 | S | * | 4/2000 | Bagley et al. ............. D21/329 |
| D428,937 | S | * | 8/2000 | Clemmer et al. .......... D21/329 |
| 6,312,335 | B1 | * | 11/2001 | Tosaki et al. ................. 463/37 |
| 6,545,661 | B1 | * | 4/2003 | Goschy et al. ............. 345/158 |

FOREIGN PATENT DOCUMENTS

| JP | 60-175290 | 11/1985 |
| JP | 63-288182 | 11/1988 |
| JP | 1-15416 | 5/1989 |

(Continued)

OTHER PUBLICATIONS

RADICA: Play TV Bass Fishin Intruction Manual, Radica China Ltd. (2000), pp. 1-3.*

(Continued)

*Primary Examiner*—Jessica Harrison
*Assistant Examiner*—Jason Skaarup
(74) *Attorney, Agent, or Firm*—Arent Fox PLLC

(57) ABSTRACT

A fishing game apparatus (10) has a casting rod (12) connected to a television monitor (16). The casting rod (12) is built therein with a game processor and an acceleration sensor. During casting, an acceleration signal is inputted from the acceleration sensor to the game processor. The game processor calculates a corresponding casting distance and displays, on a game screen of the monitor (16), a splashdown point according to a distance calculated. By providing a light gun in the casting rod (12), the game processor can recognize a direction of casting and move the rod in that direction on the game screen.

22 Claims, 6 Drawing Sheets

FOREIGN PATENT DOCUMENTS

| | | |
|---|---|---|
| JP | 7-15486 | 2/1995 |
| JP | A-8-155147 | 6/1996 |
| JP | 10-214155 | 8/1998 |
| JP | 3058089 | 3/1999 |
| JP | A-11-188182 | 7/1999 |
| JP | 2000-225269 | 8/2000 |

OTHER PUBLICATIONS

'Fishing Games: The Evolution of Virtual Fishing Games', downloaded from http://www.virtualpet.com/vp/media/fishing/fishing.htm, pp. 6-11, accessed on Oct. 22, 2004.*

* cited by examiner

FISHING GAME DEVICE

TECHNICAL FIELD

This invention relates to a fishing game apparatus and, more particularly, to a novel game apparatus having a casting rod to be electrically connected to a television monitor to allow casting with the casting rod, thereby playing a fish game on the game screen.

PRIOR ART

Conventionally, fishing games has been popular in video game. Playing a fishing game on a television is costly because of a need to prepare a video game console and fishing game software. With a controller attached to the video game console, there is short of a sense of reality. Hence, nowadays the controllers dedicated for fishing games have bee available in the market. The use of such an exclusive controller pushes the costs up.

On the other hand, fishing game apparatus of a casting rod shape is also available. This fishing game apparatus has, in a casting rod, an acceleration switch built-in, the game processor and a liquid crystal display. A casting action in an actual manner gives an acceleration to the rod. If the magnitude of the acceleration is greater than a certain value, the acceleration switch turns on. The game processor detects the timing when the acceleration switch turns on. On the basis of the timing, the game processor determines kind and size of available fishes by making reference to a data table, thereby determining whether a fish is to be hooked up or not. The game player is allowed to watch a series of processes with displaying a fishing field or water place on the liquid crystal display.

In the latter conventional art, not a TV game, a game player needs not to prepare a costly video game apparatus, therefore the player can enjoy a fishing game readily. However, the LCD screen is too small to watch the game image, the fishing game still lacks reality.

SUMMARY OF THE INVENTION

Therefore, it is a primary object of the present invention to provide a fishing game apparatus which displays a game scene on a television monitor to allow a fishing game to be played with such a realistic sensation as not to be offered by the conventional TV video game.

The present invention is a fishing game apparatus for displaying a game scene of a fishing game on a television display, the fishing game apparatus comprising: a casting rod; an acceleration sensor provided in the casting rod to output an acceleration signal during casting; and a game processor provided in the casting rod to determine a casting distance on the game screen by processing an acceleration signal.

The casting rod incorporating the acceleration sensor and game processor is connected to the television monitor through an AV cable, etc. When a game player does casting action using the casting rod (casting) toward the monitor screen, the game processor calculates a casting distance in accordance with an acceleration signal from the acceleration sensor, and displays on the screen a splashdown point in a position according to the distance.

Incidentally, in the case the casting rod has a function of a light gun, the game processor calculates a position of a light spot on the television monitor according to an output from light spot detecting means and displays a rod on the game screen as if a line is casted in the direction of the light spot.

According to the invention, a fishing game can be readily enjoyed because of unnecessity of preparing a video game console or game software. Displaying a game image on a television monitor allows a game player to have more realistic sensation than that of the conventional liquid crystal display.

Further, it is possible to detect a casting intensity, or casting distance, according to an acceleration signal sent from an acceleration sensor. Thus, reality is further enhanced.

The above described objects and other objects, features, aspects and advantages of the present invention will become more apparent from the following detailed description of the present invention when taken in conjunction with the accompanying drawing.

BEST MODE FOR CARRYING OUT THE INVENTION

Figure 1:
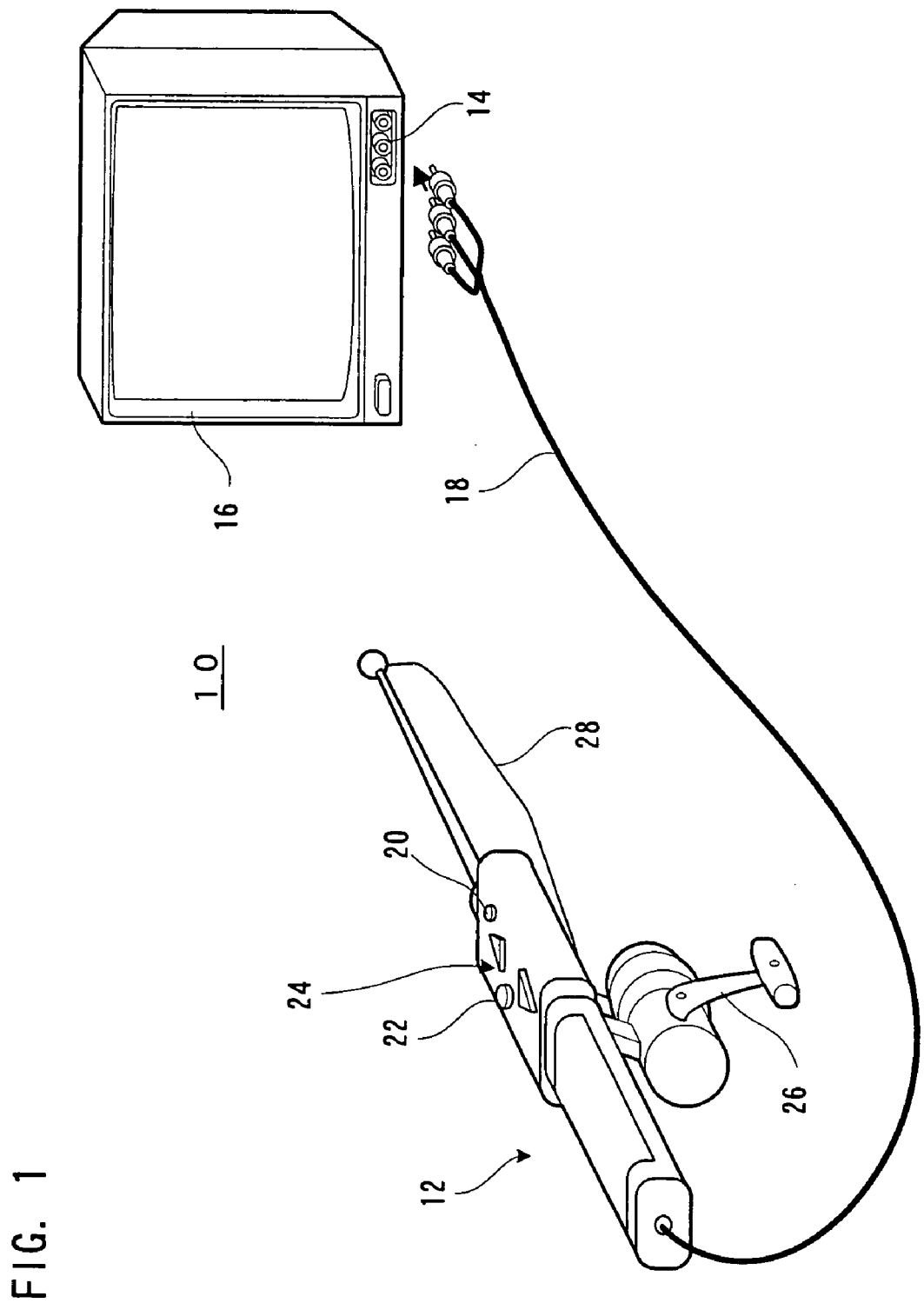
FIG. 1 is a configuration diagram showing a fishing game apparatus of an embodiment of the present invention.

A fishing game apparatus 10 of an embodiment of the present invention as illustrated in FIG. 1 includes a casting rod 12. The rod 12 is connected to an AV terminal 14 of a television monitor 16 through an AV cable 18. When a game player does casting action using the casting rod 12 toward a screen of the television monitor 16, a rod a11 (FIG. 2) casts a line on the game screen of the monitor 16. The television monitor 16 can use a display capable of displaying an image by a video signal for television monitor such as, raster scanning display and a dot matrix display. However, in the case a direction identifying function cooperative with the television monitor 16 is added, as hereinafter described, a raster scanning display must be used as the television monitor 16.

The casting rod 12 has a housing 30 (FIG. 3) formed of plastic, or the like. The housing has, on the top surface, a power supply switch 20, a select key 22 and a tension key 24. The select key 22 on a menu screen is operated to select a lure kind and a fishing field (water place). The tension key 24 is used to adjust a tension of a fish line displayed on the game screen, and includes upward and downward keys for increasing and decreasing the tension.

A reel handle 26 is provided in a lower part of the housing of the casting rod 12 which the game player is allowed to reel in order to hook a fish during fighting, or the like. The casting rod 12 has a relatively tough fish line 28 formed of plastic, or the like. The fish line 28 has one end fixedly held at tip of the casting rod 12, and the other end is elastically held at the lower part of the housing the reel handle is provided. When shaking the casting rod 12 for casting, the fish line 28 is drawn by a game player, thereby turning a casting switch 56 (FIG. 3) on.

Figure 2:
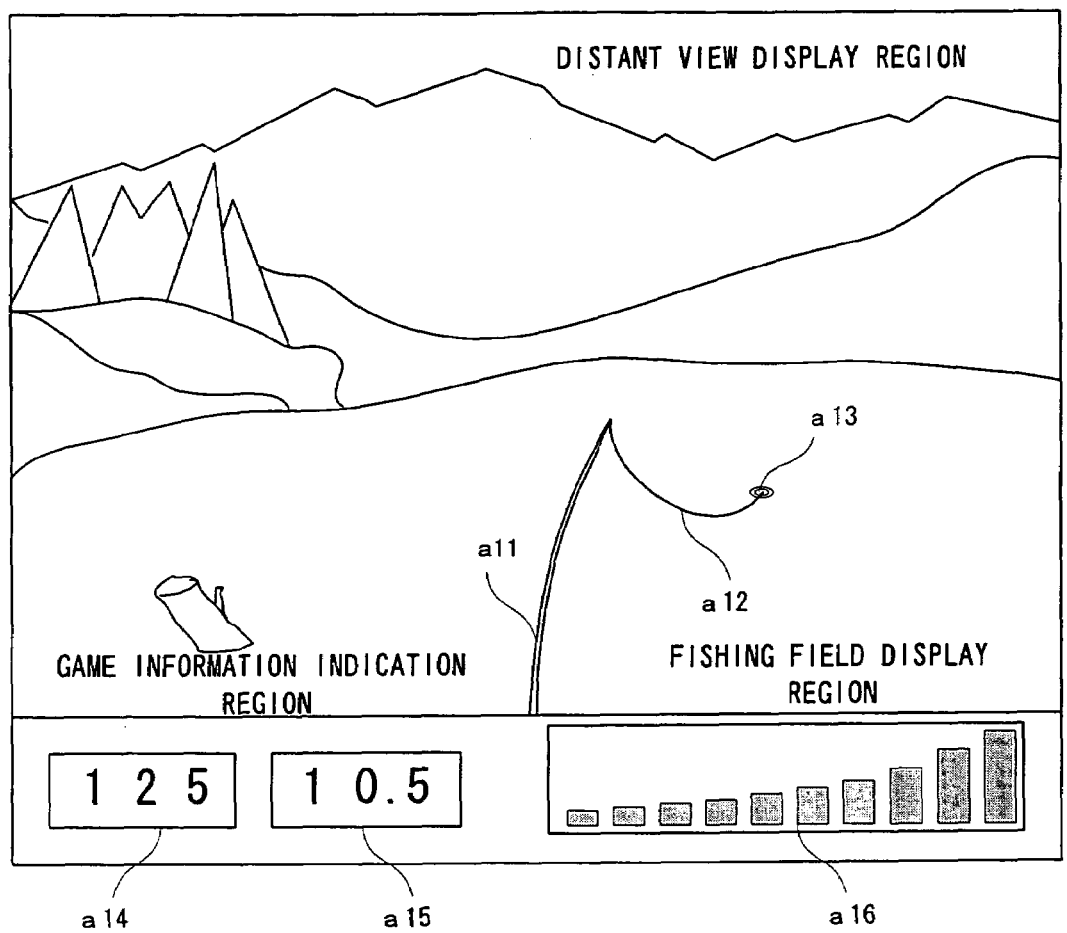
FIG. 2 is an illustrative view showing an example of a game screen in the FIG. 1 embodiment.

In the fishing apparatus 10 of FIG. 1, a game screen as illustrated in FIG. 2 is displayed on the television monitor 16. The game screen is formed with a distant view display region, a fishing field display region and a game information indication region. The distant view display region is mainly a background picture image called "text screen", and the fishing field display region is mainly a moving picture image called "sprite". Besides a change of a color to express a lapse of time, during a game, the distant view display region is not changed in each display element. The fishing field display region displays a water place where a rod figure (may be referred merely to as "rod") all, and a fishing line figure a12 extending from the tip end of the rod figure a11 to a splashdown point a13 are displayed. By shaking the casting rod 12 of FIG. 1, the fishing field display region displays the splashdown point a13 that is determined by a direction of the casting rod 12 toward the screen 16, and an intensity of the shaking.

The game information indication region consists of a distance indication area a14 for indicating a casting distance on a meter unit, a weight indication area a15 for indicating a weight of a captured fish on a kilogram unit, and a tension indication area a16 for indicating a tension on the fishing line a12 with a bar graph step by step. Incidentally, in the embodiment, a tension exceeding a predetermined value, results in lost (failure of the fishing). Accordingly there is a need for a game player to control the tension with skilful operation.

Figure 3:
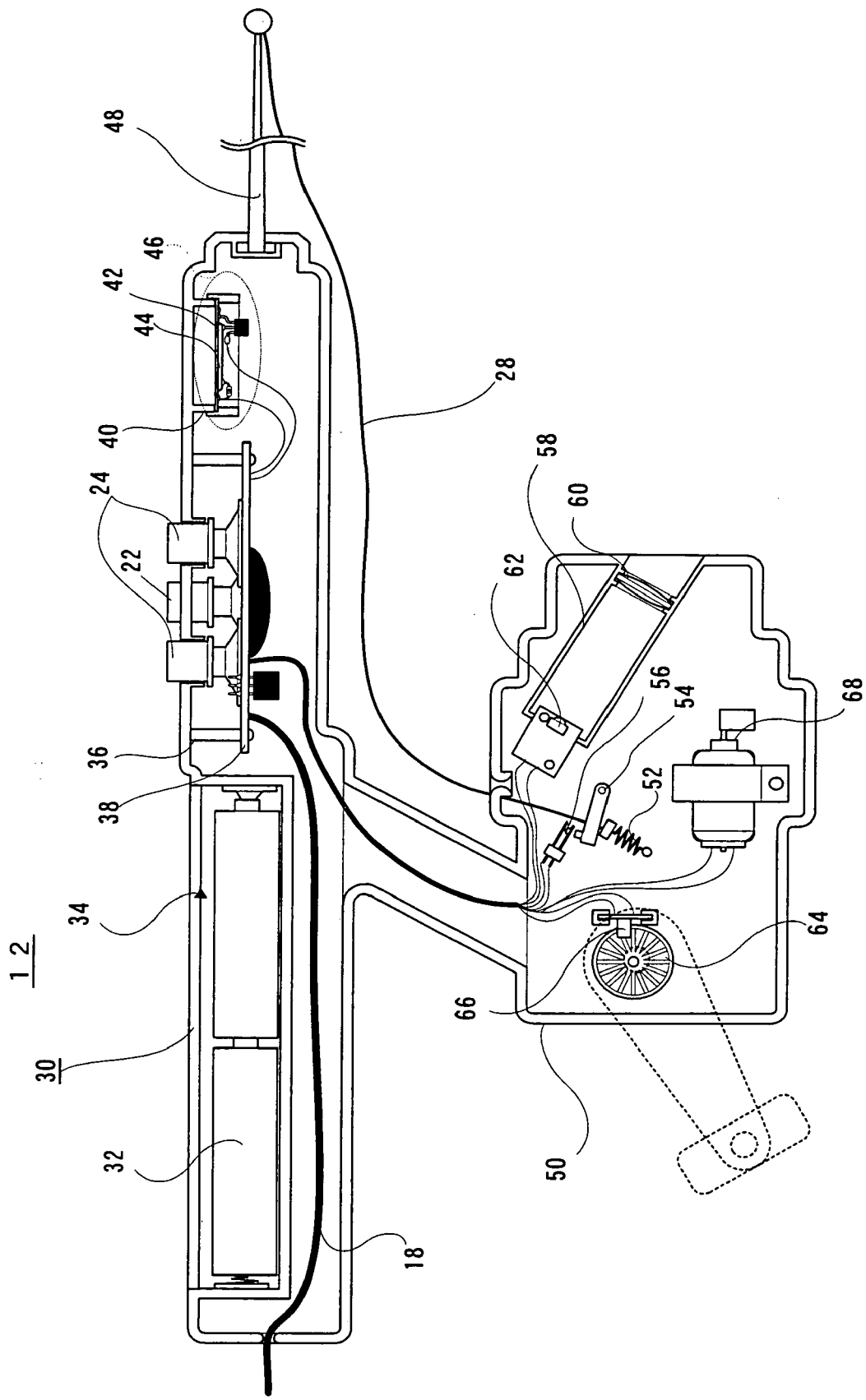
FIG. 3 is an illustrative view showing a structure of a casting rod of the FIG. 1 embodiment.

As shown in FIG. 3 the casting rod 12, as viewed from the sideways, for example, includes the gun shaped housing 30 having a battery box 34 housing a battery 32, thereby supplying electric power to each component. Incidentally, so-called an AC/DC adapter may be used in place of the battery. However, considering game player's actual casting, a battery is more preferable because of an obstructive cord of the AC/DC adapter.

Figure 4:
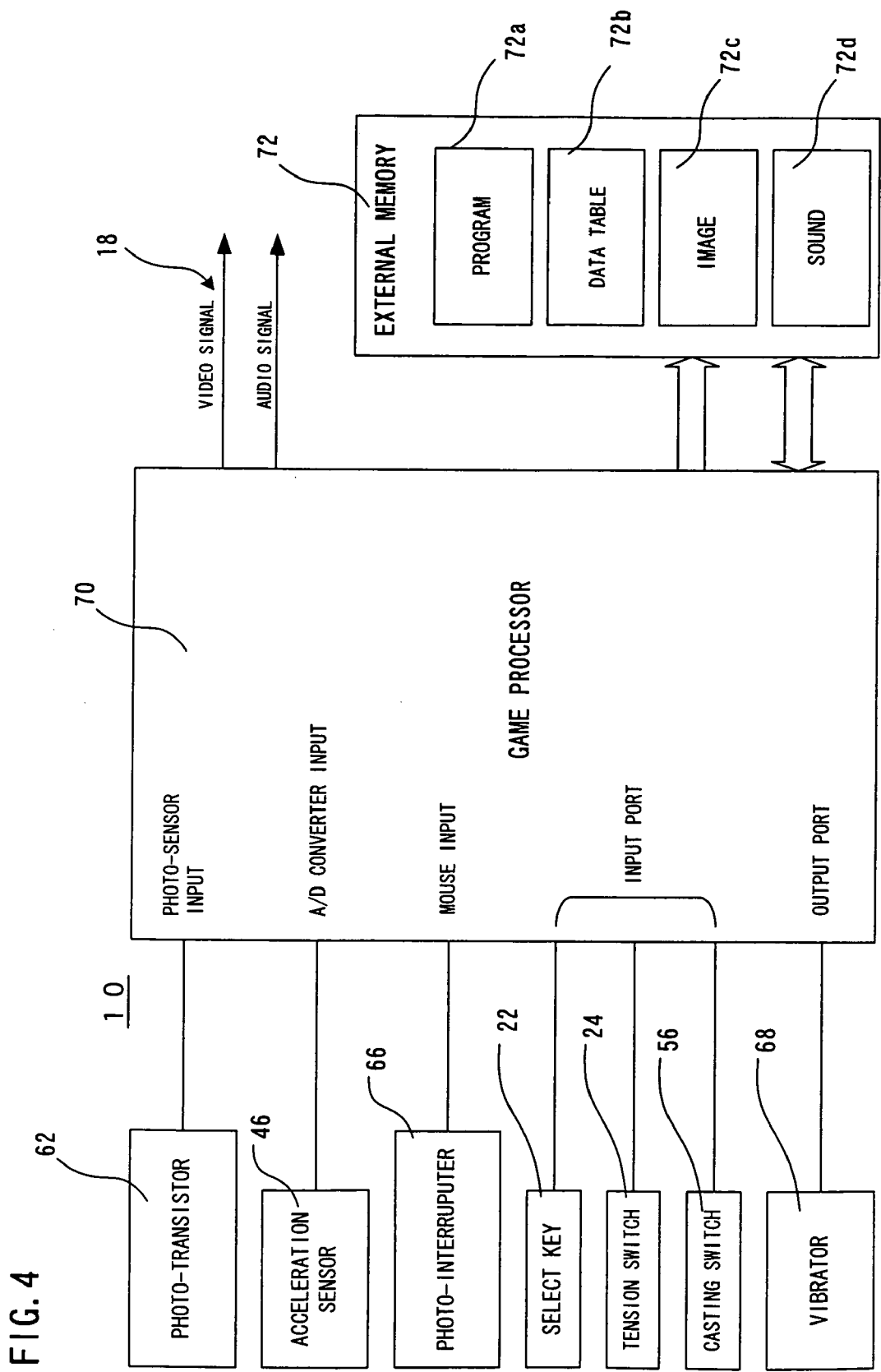
FIG. 4 is a block diagram showing the FIG. 1 embodiment.

A boss 36 is formed extending vertically downward from an upper inside of the housing 30 in a position forward of the buttery within the housing 30. The boss 36 holds a printed circuit board 38. The printed circuit board 38 has thereon keys 22 and 24. A game processor 70 shown in FIG. 4 is also mounted on the printed board 38.

A boss 40, extending vertically downward alike the boss 36, is formed at a front part in the housing 30. The boss 40 holds an acceleration sensor board 42. The acceleration sensor board 42 is mounted thereon with a piezoelectric buzzer 44 having a function as an acceleration sensor and circuit elements such as transistors used therewith. Herein, circuit elements on the acceleration sensor board 42 including the piezoelectric buzzer 44 are referred to as an acceleration sensor 46.

A tip rod 48, protruding forward and of plastic or the like, is attached in the front end of the housing 30.

A reel housing 50 is formed at the lower part of the housing 30. The reel housing 50 is a part of the housing 30 but may be shown at another reference numeral, for the sake of convenience. Above-mentioned fish line 28 has one end fixed to the end of the tip rod 48 and the other end extended to the inside the reel housing 50. The other end of the fish line 28 is fixed through a spring 52 within the reel housing 50. Accordingly, when the fish line 28 is drawn by the game player, the spring 52 is extended to move the fish line 28 so that the other end of the fish line 28 is drawn out from the reel housing 50. Accordingly, an action chip 54 fixed at the other side of the fish line 28 is rotated, thereby turning the casting switch 56 on. The action chip 54 is rotatably held at an inner wall of the reel housing 50 and fixed at a free end to the fish line 28. Consequently, when the fish line 28 is drawn out, the action chip 54 correspondingly rotates in the direction of drawn. The action chip 54 presses a contact, thereby turning a casting switch 56 on.

A tip-opened cylindrical part 58 is formed in a front part of the reel housing 50. In the vicinity of the tip opening of the cylindrical part 58, a focusing lens 60 formed of plastic or the like is attached. In the cylindrical part 58 at a rear of the focusing lens 60, a light-receiving element, e.g. the phototransistor 62 is provided in a position of receiving the light focused by the focusing lens 60. Consequently, when the light is incident through a focusing lens 60, the phototransistor 62 receives the light and outputs an electrical signal. The signal from the phototransistor 62 is inputted to after-mentioned game processor 70 (FIG. 4), whereby the game processor 70 (FIG. 4) can recognize where the casting rod 12 is directed on the screen. That is, the focusing lens 60 and the phototransistor 62 serves as so called a light pen or a light gun to detect the position of a light spot during rasterscanning the television monitor 16.

As shown in FIG. 1, the reel handle 26 is rotatably held to the reel housing 50. A slit plate 64 fixed on a rotating shaft of the reel handle 26 is rotatably supported within the reel housing 50. The slit plate 64 has a plurality of slits distributed at an equal interval in the circumferential direction. A photo-interrupter 66 has a light-emitting element and a light-receiving element oppositely disposed sandwiching the slit plate 64. Accordingly, as the slit plate 64, i.e. reel handle 26 (FIG. 1) rotates, a pulse signal is outputted from the photo-interrupter 66. The pulse signal is inputted to hereinafter-mentioned game processor 70. Due to this, the game processor 70 can detect a rotation amount of the reel handle 26.

A vibrator 68 such as an eccentric motor is further provided within the reel housing 50. The vibrator 68 operates, upon hooking a fish, to give vibrations to the player, as if he or she actually played fishing. The vibrator 68 can use, besides an eccentric motor, anything such as an electromagnetic solenoid, provided that it offers this kind of vibration.

The game processor 70 shown in FIG. 4 is mounted on the printed circuit board 38 shown in FIG. 3. The game processor 70 may use any processor. However, the embodiment uses a high-speed processor that the present applicant has developed and filed. For example, the high-speed processor is disclosed in detail in a Japanese Patent Laid-open No. 307790/1998 (G06F13/36, 15/78) and the corresponding U.S. patent application Ser. No. 09/019,277.

The game processor 70, although not shown, includes various processors such as an CPU, a graphic processor, a sound processor and a DMA processor, and includes an A/D converter for receiving an analog signal and an input/output control circuit for receiving an inputted signal such as a key operation signal and supplying an output signal to an external apparatus. The CPU executes required operation according to an inputted signal and provides a result thereof to another processor. The graphic processor executes a graphic process as required by the operation result, and generates a changing game image. Similarly, the sound processor executes a sound process required by the operation result.

The game processor 70 is connected with an external memory 72 through an external bus. The external memory 72 is ROM and/or RAM, and includes a program area 72a, a data table area 72b, an image data area 72c, and a sound data area 72d. The program area 72a is stored with a game control program shown in FIG. 6, hereinafter referred. The data table area 72b is stored with a data table showing weather, kind of fish according to the weather, fish inhabitation, and fish weight for each water place (water field). The image data area 72c is stored with all the image data such as the rod figure a11 and the fishing line figure a12 displayed on the game screen shown in FIG. 2, and other required image data. The sound data area 72d is stored with sound for game music and effective sound.

Then, while the output from the phototransistor 62 explained referring to FIG. 3 is inputted to the game processor 70, an acceleration correlation voltage signal from the acceleration sensor 46 is provided to an A/D converter input of the game processor 70. The pulse signal from the photo-interrupter 66 is provided to a mouse input of the game processor 70. A signal from each of keys or switches 22, 24 and 56 is inputted to an input port of the game processor 70. Meanwhile, the game processor 70 outputs through an output-port a drive signal to the vibrator 68.

Then, a video signal (forming game images) and audio signal (sound effect, music) is provided from the game processor 70 to the television monitor 16 through the AV cable 18.

Figure 5:
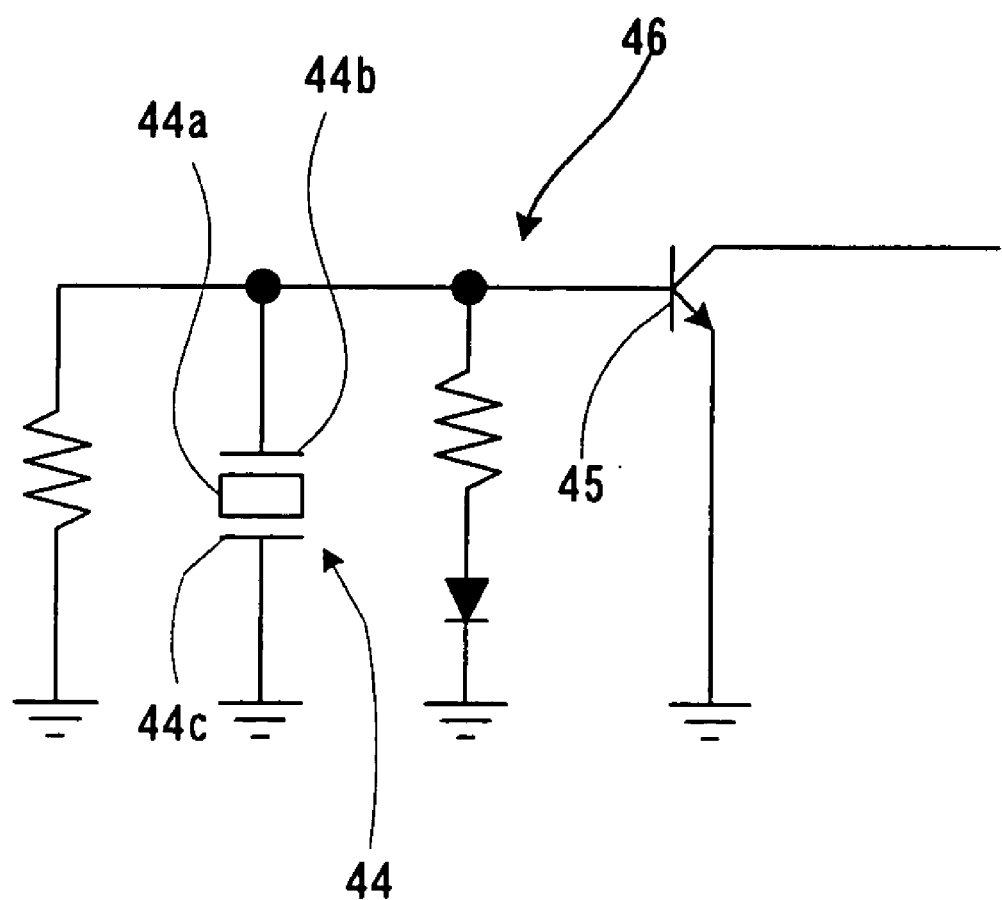
FIG. 5 is a circuit diagram showing an example of an acceleration sensor of the FIG. 1 embodiment.

Explanation is herein made on the utilization of the piezoelectric buzzer 44 as an acceleration sensor. As well known, the piezoelectric buzzer 44, as shown in FIG. 5, has a piezoelectric ceramic plate 44a such as of barium titanate or PZT having electrodes 44b, 44c formed on the main surfaces. In the embodiment, the piezoelectric buzzer 44 is utilized as an acceleration sensor.

More specifically, as described above, when swinging the casting rod 12, the piezoelectric buzzer 44 is provided within the casting rod 12 such that the main surface thereof is perpendicular to a direction of swinging the casting rod 12. When the casting rod 12 is swung by the game player, an intense centrifugal force acts thereon. Accordingly, the piezoelectric plate 44a of the piezoelectric buzzer 44 is distorted by the centrifugal force to cause a potential difference between the main surfaces of the piezoelectric plate 44a depending on the centrifugal force. The potential difference varies depending on the stress (centrifugal force) acted on the piezoelectric plate 44a. As the stress increases, the potential difference increases, while the stress is decreases, the potential difference decreases. In other words, the potential difference on the piezoelectric buzzer 44 varies in accordance with a velocity and intensity of swing of the casting rod 12 by the game player. Thus, this embodiment can use the piezoelectric buzzer 44 as an acceleration sensor.

The potential difference caused in the piezoelectric buzzer 44 is provided to a base of a transistor 45. Accordingly, the transistor 45 amplifies a magnitude of the potential difference, and outputs a voltage signal. The voltage signal is given an acceleration correlation signal, and is inputted to the A/D converter of the game processor 70, as described above. Therefore, the game processor 70 can import the acceleration of the casting rod 12 as data during casting.

Figure 6:
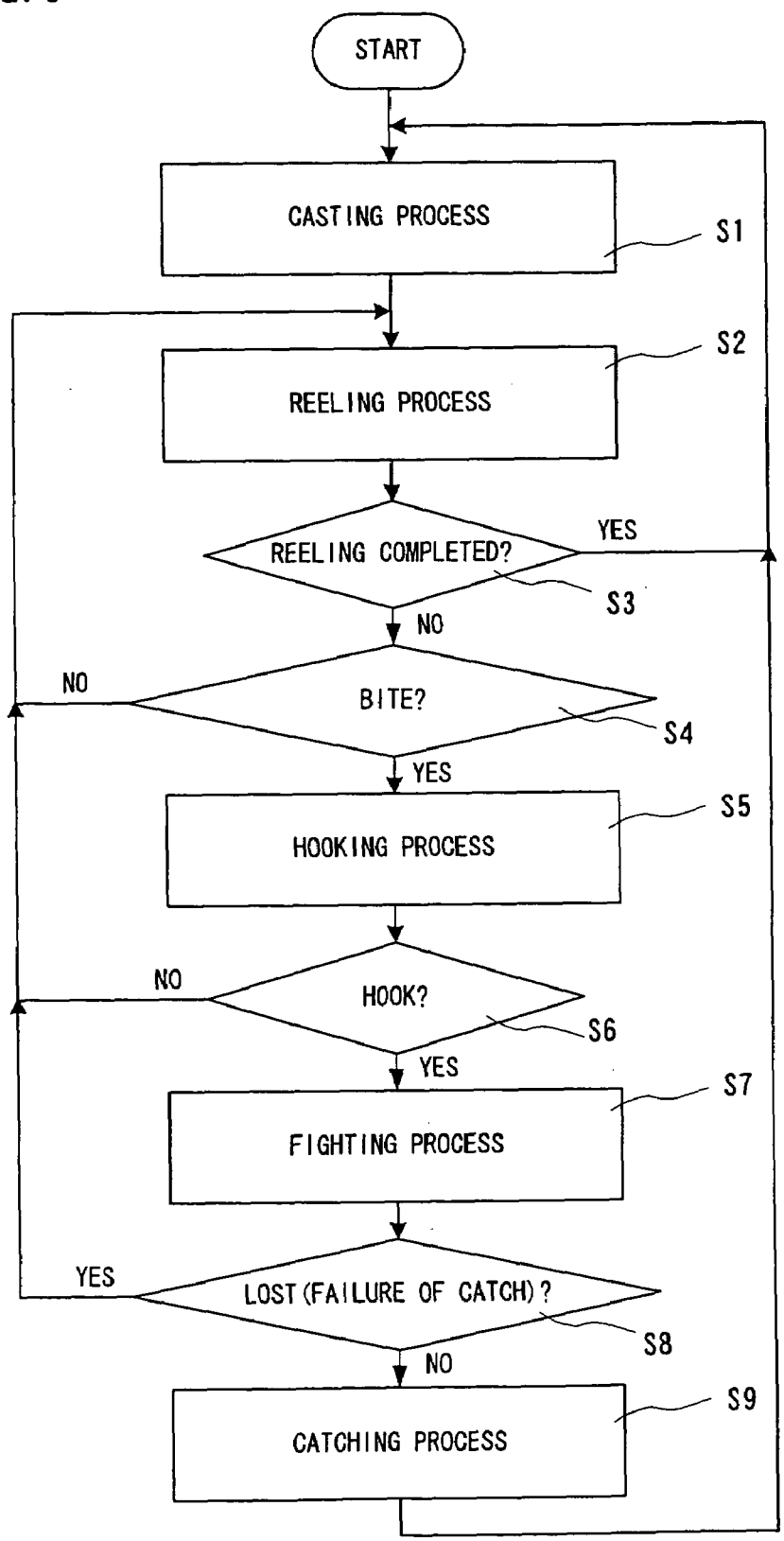
FIG. 6 is a flowchart showing operation of the FIG. 1 embodiment.

In the game mode, the game processor 70 controls the overall operation, according to the flowchart of FIG. 6. Before starting the operation of FIG. 6, a game player determines, on a menu screen, a fishing place, lure to be used, etc. in advance by utilizing the select key 22. First, in step S 1, the fish line 28 (FIG. 1, FIG. 3) is drawn out. Then turn the casting switch 56 on. Next, the game player swings the casting rod 12 in a feeling of actual fishing. At this time, the direction of casting is found by the light gun function mentioned above. In short, when the phototransistor 62 detects a rasterscanning light spot on television monitor 16, the game processor 70 detects the position of the light spot in the screen by making reference to horizontal and vertical counters (both not shown) counting a horizontal synchronizing signal and a vertical synchronizing signal, respectively. The position in the screen gives a direction of swinging the casting rod 12. At the same time, because an acceleration signal from the acceleration sensor 46 is inputted to the game processor 70, the game processor 70 recognizes an acceleration, i.e. intensity of the swing occurring on the casting rod 12. In accordance with the casting direction and intensity (distance) thus detected, the game processor 70 determines positions and shapes of the rod figure a11, fishing line figure a12 and splashdown point a13 on the game screen as shown in FIG. 2, and forms a corresponding game image. Each process so far is executed in step S1.

Incidentally, the game processor 70 displays a numeral in a distance indication area a14 (FIG. 2) according to the casting distance calculated in step S1.

In step S2, the process is executed according to an operation of the reel handle 26 by the game player. Namely, a length of the fish line a12 is detected on the basis of the position of the rod a11 and the splashdown point a13 (lure position) on a game image screen. On the other hand, a length of reeling is calculated in real time by counting a pulse signal outputted from the photo-interrupter 66, upon rotation of the reel handle 26. By subtracting a length of reeling from a length of a fish line, a fish line at that time is calculated. Once a length of a fish line comes below a certain value in step S3, the end of reeling is determined. If there is no change until "Yes" is determined in step S3, the game player returns to step S1 to start again casting.

If "NO" is determined in step S3, that is, if there is a fish biting by the end of the reeling, the process proceeds to step S4. Then, whether a fish bites a lure or not is determined at random on the basis of the data table described above. If "YES" is determined in step S4, the game processor 70 outputs a drive signal to drive the vibrator 68 and give vibrations to player.

In step S5 and step S6, a hooking process is executed. The game processor 70 detects an intensity of hooking by utilizing the acceleration sensor 46 also this time. Then, in step S6, the game processor 70 determines on the basis of fish kind, lure kind, fish size, time between a biting and a hooking and hooking intensity, whether hooking is successful or not. If the hooking is successful, a fighting process is executed in the following step S7 and S8.

In step S7, the game player performs a fighting operation, such as controlling a tension of the fish line a12 (FIG. 2) by utilizing the tension key 24 (FIG. 1, FIG. 4) during reeling, and changing a position of the rod a11 (FIG. 2) up, down, left and right by swinging the casting rod 12. Then, the game processor 70 determines whether lost or not, according to the fact that tension reached a certain value or a fish moved outside a certain range or the like.

"NO" determination in step S8 means successful hooking. In step S9, the game processor 70 executes the weight indication a15 (FIG. 2) by reading data from a data table.

Meanwhile in step S1 to step S9 in FIG. 6, the game processor 70 displays a tension changing in real time in the tension graph a16.

Although the present invention has been described and illustrated in detail, it is clearly understood that the same is by way of illustration and example only and is not to be taken bay way of limitation, the spirit and scope of the present invention being limited only by the terms of the appended claims.

What is claimed is:

1. A fishing game apparatus for displaying on a television monitor a game screen of a fishing game, the fishing game apparatus comprising:
   a casting rod capable of being swung in a direction by a game player in casting;
   a fish line having a first end thereof connected to said casting rod;
   a casting switch means for indicating casting when said fish line is drawn;
   a piezoelectric buzzer provided in said casting rod, said piezoelectric buzzer having a piezoelectric plate a main surface of which is perpendicular to said direction and electrodes sandwiching said piezoelectric plate, a potential difference appearing between said electrodes when said casting rod is swung; and
   a game processor provided in said casting rod to determine a casting distance on the game screen by processing said potential difference appearing between said electrodes.

2. A fishing game apparatus according to claim 1, wherein said television monitor includes a scanning display, said casting rod further includes light spot detecting means for detecting a light spot of said scanning display, and said game processor determines a direction of casting on the game screen according to an output of said light spot detecting means.

3. A fishing game apparatus according to claim 1, further comprising an AV cable connecting said casting rod with said television monitor to supply a video signal and audio signal from said game processor to said television monitor through said AV cable.

4. A fishing game apparatus according to claim 1, further comprising an information storage medium,
   said game processor including at least operation processing means, image processing means and a memory,
   said operation processing means executing a program code stored in said information storage medium and calculating the casting distance on the basis of said acceleration signal from said acceleration sensor to administer the fishing game,
   said image processing means generating image information to be displayed on said television monitor by using image data stored in said information storage medium under control of said operation processing means,
   said memory being for a least said operation processing means to hold progress and result of the operation.

5. A fishing game apparatus according to claim 4, wherein said information storage medium includes a non-volatile semiconductor memory.

6. A fishing game apparatus for displaying on a television monitor a game screen of a fishing game, comprising:
   a casting rod capable of being swung in a direction by a game player in casting;
   a reel handle attached to said casting rod so as to be freely rotated;
   a fish line having a first end thereof connected to said casting rod:
   a casting switch means for indicating casting when said fish line is drawn;
   a piezoelectric buzzer provided in said casting rod, said piezoelectric buzzer having a piezoelectric plate a main surface of which is perpendicular to said direction and electrodes sandwiching said piezoelectric plate, a potential difference appearing between said electrodes when said casting rod is swung;
   a rotation amount associated signal generating means provided to be interactive with said reel handle for outputting a rotation amount associated signal associated to a rotation amount of said real handle;
   a game processor provided in said casting rod; and
   a memory provided in said casting rod for saving a program and image data which are read-out by said game processor, wherein
   said game processor includes a first input means for receiving said potential difference, and a second input means for receiving said rotation amount associated signal, and
   calculates a distance of the casting in accordance with said potential difference applied to said first input means,
   produces a game screen according to the calculated distance by reading-out the image data in correspondence to the casting operation from said memory,
   calculates a reeling length in accordance with said rotation amount associated signal applied to said second input means, and
   determines the reeling operation based on said casting distance and said reeling length.

7. A fishing game apparatus according to claim 6, wherein said television monitor includes a scanning display, said casting rod further includes light spot detecting means for detecting a light spot of said scanning display, and said game processor determines a direction of casting on the game screen according to an output of said light spot detecting means and calculates the casting distance according to the information applied from said first input means.

8. A fishing game apparatus according to claim 6, further comprising a tension key operated by a game player to control a tension of a fishing line displayed on said game screen, and
   said game processor determines that the game player fails to catch a fish when a value of said tension reaches a predetermined value.

9. A fishing game apparatus according to claim 6, wherein said rotation amount associated signal generating means generates said rotation associated signal as the numbers of pulse signals, and
   said second input means includes a mouse which counts said pulse signals.

10. A fishing game apparatus according to claim 6, wherein said casting rod further includes a vibrator, and
    said game processor give a vibration by driving said vibrator when bite by the fish occurs in progress of game.

11. A fishing game apparatus according to claim 1, further comprising a tension key operated by a game player to control a tension of a fishing line displayed on said game screen, and
    said game processor determines that the game player fails to catch a fish when a value of said tension reaches a predetermined value.

12. A fishing game apparatus according to claim 1, wherein said rotation amount associated signal generating means generates said rotation associated signal as the number of pulse signals, and
    said second input means includes a mouse input which counts said pulse signals.

13. A fishing game apparatus according to claim 1, wherein an output of said casting switch means is input to said game processor.

14. A fishing game apparatus according to claim 13, wherein a second end of the fish line terminates inside said casting rod.

15. A fishing game apparatus according to claim 13, wherein a second end of the fish line terminates at a spring inside said casting rod.

16. A fishing game apparatus according to claim 15, wherein drawing the fish line extends the spring, and wherein the spring activates the casting switch means to indicate casting.

17. A fishing game apparatus according to claim 6, wherein an output of said casting switch means is input to said game processor.

18. A fishing game apparatus according to claim 17, wherein a second end of the fish line terminates inside said casting rod.

19. A fishing game apparatus according to claim 17, wherein a second end of the fish line terminates at a spring inside said casting rod.

20. A fishing game apparatus according to claim 19, wherein drawing the fish line extends the spring, and wherein the spring activates the casting switch means to indicate casting.

21. A fishing game apparatus for displaying on a television monitor a game screen of a fishing game, the fishing apparatus comprising:
   a casting rod capable of being swung in a direction by a game player in casting;
   a fish line having a first end thereof connected to said casting rod;
   a casting switch means for indicating casting when said fish line is drawn;
   a piezoelectric buzzer provided in said casting rod, said piezoelectric buzzer having a piezoelectric plate a main surface of which is perpendicular to said direction and electrodes sandwiching said piezoelectric plate, a potential difference appearing between said electrodes when said casting rod is swung;
   a transistor which amplifies a magnitude of said potential difference and outputs a voltage signal;
   a game processor provided in said casting rod, wherein said game processor includes an A/D converter for receiving said voltage signal, and determines a casting distance on the game screen by processing said voltage signal.

22. A fishing game apparatus for displaying on a television monitor a game screen of a fishing game, the fishing apparatus comprising:
   a casting rod capable of being swung in a direction by a game player in casting;
   a fish line having a first end thereof connected to said casting rod;
   a casting switch means for indicating casting when said fish line is drawn;
   a piezoelectric buzzer provided in said casting rod, said piezoelectric buzzer having a piezoelectric plate a main surface of which is perpendicular to said direction and electrodes sandwiching said piezoelectric plate, a potential difference appearing between said electrodes when said casting rod is swung;
   a transistor which amplifies a magnitude of said potential difference and outputs a voltage signal;
   a rotation amount associated signal generating means provided to be interactive with said reel handle for outputting a rotation amount associated signal associated to a rotation amount of said reel handle;
   a game processor provided in said casting rod; and
   a memory provided in said casting rod for saving a program and image data which are read-out by said game processor, wherein
   said game processor includes an A/D converter for receiving said voltage signal, and an input means for receiving said rotation amount associated signal, and
   calculates a distance of the casting in accordance with said voltage signal applied to said A/D converter,
   produces a game screen according to the calculated distance by reading-out the image data in correspondence to the casting operation from said memory,
   calculates a reeling length in accordance with said rotation amount associated signal applied to said input means, and
   determines the reeling operation based on said casting distance and said reeling length.

* * * * *